United States Patent [19]

Hayes

[11] Patent Number: 4,718,107
[45] Date of Patent: Jan. 5, 1988

[54] PARENTAL CONTROL FOR CATV CONVERTERS

[75] Inventor: John J. Hayes, Chesapeake, Va.

[73] Assignee: RCA Corporation, Princeton, N.J.

[21] Appl. No.: 829,242

[22] Filed: Feb. 14, 1986

[51] Int. Cl.$^4$ .......................... H04H 1/02; H04N 7/00
[52] U.S. Cl. ........................................ 455/4; 455/131;
                                              455/26.1; 358/349; 358/86
[58] Field of Search .................. 455/4, 131, 1, 26.1,
                          455/181, 186, 151; 380/20; 358/86, 349

[56] References Cited

U.S. PATENT DOCUMENTS

| | | | |
|---|---|---|---|
| 4,348,696 | 9/1982 | Beier | 358/349 |
| 4,375,651 | 3/1983 | Templin et al. | 455/186 |
| 4,425,579 | 1/1984 | Merrell | 455/186 |
| 4,510,623 | 4/1985 | Bonneau et al. | 455/181 |

Primary Examiner—Jin F. Ng
Attorney, Agent, or Firm—Paul J. Rasmussen; Peter M. Emanuel; Richard G. Coalter

[57] ABSTRACT

A controller in a CATV converter provides three operating modes comprising: (1) a family viewing mode in which conversion of selected channels is blocked; (2) an enter access code mode for selecting the channels to be blocked from family viewing; and (3) a parental control mode in which all channels may be viewed. The family viewing mode is enabled by turn-on of the converter or by commands by the user or the CATV system operator. The enter access code mode is initiated by a user command. The parental control mode is enabled by user entry of a valid access code or when a new access code is created while in the enter access code mode.

9 Claims, 12 Drawing Figures

| BIT POSITION | | | | | | | |
|---|---|---|---|---|---|---|---|
| 7 | 6 | 5 | 4 | 3 | 2 | 1 | 0 |
| BCD DIGIT 1 | | | | BCD DIGIT 0 (LSD) | | | |
| BCD DIGIT 3 (MSD) | | | | BCD DIGIT 2 | | | |

PORTION OF CONVERTER MEMORY STORING THE ACCESS CODE. CODE IS STORED AS FOUR BINARY CODED DECIMAL (BCD) DIGITS.

A VALUE OF FF,FF HEX INDICATES THAT NO ACCESS CODE EXISTS.

FIG. 4

| BIT POSITION | | | | | | | |
|---|---|---|---|---|---|---|---|
| 7 | 6 | 5 | 4 | 3 | 2 | 1 | 0 |
| 8 | 7 | 6 | 5 | 4 | 3 | 2 | 1 |
| 16 | 15 | 14 | 13 | 12 | 11 | 10 | 9 |
| 24 | 23 | 22 | 21 | 20 | 19 | 18 | 17 |
| 32 | 31 | 30 | 29 | 28 | 27 | 26 | 25 |
| 40 | 39 | 38 | 37 | 36 | 35 | 34 | 33 |
| 48 | 47 | 46 | 45 | 44 | 43 | 42 | 41 |
| 56 | 55 | 54 | 53 | 52 | 51 | 50 | 49 |

PORTION OF CONVERTER MEMORY STORING LIST OF BLOCKED CHANNELS. ONE BIT IS ALLOCATED FOR EACH CHANNEL.

THE NUMBER IN EACH CELL REPRESENTS THE CHANNEL NUMBER ASSOCIATED WITH THAT BIT POSITION.
BIT = 1: CORRESPONDING CHANNEL BLOCKED
BIT = 0: CORRESPONDING CHANNEL NOT BLOCKED

FIG. 3

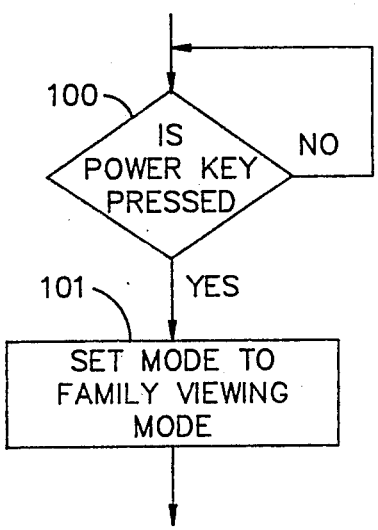
FIG. 6
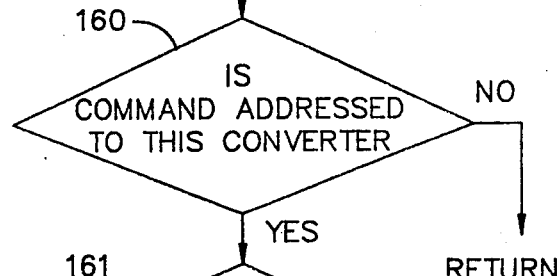
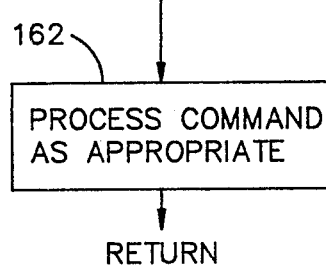
FIG. 11

PARENTAL CONTROL FOR CATV CONVERTERS

FIELD OF THE INVENTION

The present invention generally relates to electronically tuned receivers and, more particularly, to a parental control system for an addressable CATV converter.

DESCRIPTION OF THE PRIOR ART

Modern Cable Television (CATV) systems employ in-home converters for the reception of video and audio signals transmitted on cable. The primary purpose of these converters is to convert video and audio signals, corresponding to the channel selected by the user, to predetermined and fixed frequencies for application to the user's television receiver. The user keeps his television tuned to a given channel, typically channel 2 or channel 3 depending on which is an inactive broadcast channel in his area, and selects the channel number of the desired program using the set-top converter. The converter is designed so that only those programs to which the user has subscribed are viewable by the user.

Modern set-top converters can accept and process digital data emanating from a computer (the addressing computer) in the CATV business office. The digital data conveys commands which can enable or disable a converter, control viewability of channels and implement ancillary functions as well. Using an addressable converter, the level of service provided to a subscriber can be changed easily and quickly without having to send a technician to the subscriber's home, or require the subscriber to return his converter.

Modern set-top converters are also capable of providing a feature called "Parental Control". This feature permits a user (parent) to "block" certain channels from being viewed. The user programs into the converter those channels to be blocked. The user then enters a multi-digit numerical access code, or locks a mechanical keyswitch, thereby preventing alteration of the blocked-channel list by persons not possessing the key or having knowledge of the access code. To watch a blocked channel, or reprogram the blocked-channel list, the user must first unlock the keyswitch or enter the correct access code.

A parental control feature has been available in some television receivers. One example is shown in U.S. Pat. No. 4,510,623 to Bonneau et al. In such television receivers, the list of blocked channels is "locked" into memory using a 4-digit access code, as opposed to using a mechanical keyswitch. In the parental control system for these television receivers, the blocked-channel list is stored permanently in the television memory, even if AC power is removed from the receiver.

Using non-volitile memory to store the blocked channel list and the user-defined access code results in a potentially serious problem. If the user programs channels to be blocked and then forgets the access code, the user is unable to watch the blocked channels until he remembers the correct code, happens to guess the correct code, or pays to have the television serviced to erase the memory. To avoid disgruntled customers and avoid unnecessary service calls, one solution to this problem is to have the list of blocked channels to be effective for only a 12-hour period. After twelve hours, the blocked-channel list is automatically cleared from memory and the access code purged. The television receiver then permits viewing of any channel and will accept any four-digit code as the new access code. Thus, when a customer forgets his access code, all channels will be viewable and the access code purged within twelve hours.

Although the implementation chosen for these television receivers solves the dilemma for the customer who forgets his access code, it has a serious disadvantage. Users who wish to permanently maintain a blocked-channel list must reprogram the television receiver on a daily basis.

A second shortcoming in the performance of the parental control system in these television receivers also exists. If a child tries to guess the access code in an attempt to watch a blocked channel, the television receiver permits an unlimited number of guesses. Thus, a persistent or lucky child can ultimately guess an access code, especially if the parent uses the same code each time the television is programmed.

SUMMARY OF THE INVENTION

It is therefore an object of this invention to provide a CATV converter which has a parental control feature but which eliminates or lessens the disadvantages generally associated with parental control features in television receivers.

It is another object of the present invention to provide an addressable CATV converter in which data associated with the parental control feature is permanently stored in the converter memory in the absence of power failures but which is responsive to a converter specific command from a central addressing system to unblock all blocked channels and purge the user's access code.

It is a further object of the invention to provide a parental control system for an addressable CATV converter which, within a given predetermined time interval, accepts only a limited number of wrong guess codes, and if the limit is exceeded, further attempts by the user at inputting an access code are ignored during a subsequent, predetermined time period.

According to the invention, a multi-digit access code is used to "lock" the list of blocked channels into the converter memory, as opposed to a mechanical keyswitch. Immediately after the converter is installed in the customer's home, the blocked-channel list is cleared and the access code is purged. In this state, the converter can be programmed to block any or all channels and will accept any multi-digit code having a predetermined number of digits as the access code. Once a blocked-channel list and an access code is programmed into the converter, this data remains in the converter memory until one of the following conditions occurs:

1. It is changed by the user. The user must input the correct access code before he is able to change the list or redefine the access code.

2. Power is lost to the converter for a period of time exceeding five to seven days. In the preferred embodiment of the invention, only the converter address is stored in a non-volitile memory; all other data is stored in a volatile memory which is "backed-up" using a large capacitor. If data in the volatile memory is lost due to a power failure, all data defining converter operation is lost, and this includes, but is not limited to, the data associated with parental control. Therefore, even if a power failure of sufficient duration occurs which causes loss of "parental control" data, children will be unable to watch any channel because the converter becomes completely disabled. When data is lost due to a power failure, the user must notify the cable operator that the converter is disabled. The cable operator then issues commands from the addressing computer to download data to the converter to re-enable it. The user can then reprogram a blocked-channel list into the converter.

Since the blocked-channel list remains in the converter memory indefinitely in the absence of power failures, the problem of the user forgetting the access code exists as it did for the parental control system in television receivers. However, since the converter is addressable, this problem is solved as follows. A converter specific command, i.e., a command intended to be processed by a specific converter, is defined which, when recieved by the converter, causes the blocked channel list to be cleared and the access code to be purged. Thus, when the user forgets the access code, he merely visits the business office of the cable company and reports that the access code was forgotten. The cable operator can then issue a command to the subscriber's converter to clear memory associated with parental control.

Therefore, with an addressable cable converter, a converter specific command can be invoked as needed to restore any subscriber's converter to a pristine state. Since the pertinent command can be issued as required, no need exists for the converter to automatically clear memory after a fixed time interval. Thus, subscribers who remember their access code and wish to maintain a blocked-channel list can do so without having to reprogram the converter on a regular basis.

According to another feature of the invention, the design discourages children from attempting to guess the correct access code. If, during any time period of predetermined duration, the user inputs three incorrect access codes (with no intervening correct access codes), then, during a subsequent time period of predetermined duration, the converter ignores any further attempts by the user to input a code. Thus, after three incorrect guesses by a child within the first predetermined time period, the child must wait the second predetermined time period before another guess can be made. By preventing a child from making one guess after another in rapid succession, any serious or systematic attempt at guessing the correct access code is significantly impaired.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 3 is a memory map diagram illustrating a portion of the converter memory storing a list of blocked channels;

FIG. 4 is a memory map diagram illustrating a portion of the converter memory storing the access code;

FIG. 6 is a flow chart for the "converter off" operation;

FIG. 11 is a flow chart of the "addressing command received" operation.

DETAILED DESCRIPTION OF A PREFERRED EMBODIMENT OF THE INVENTION

Figure 1:
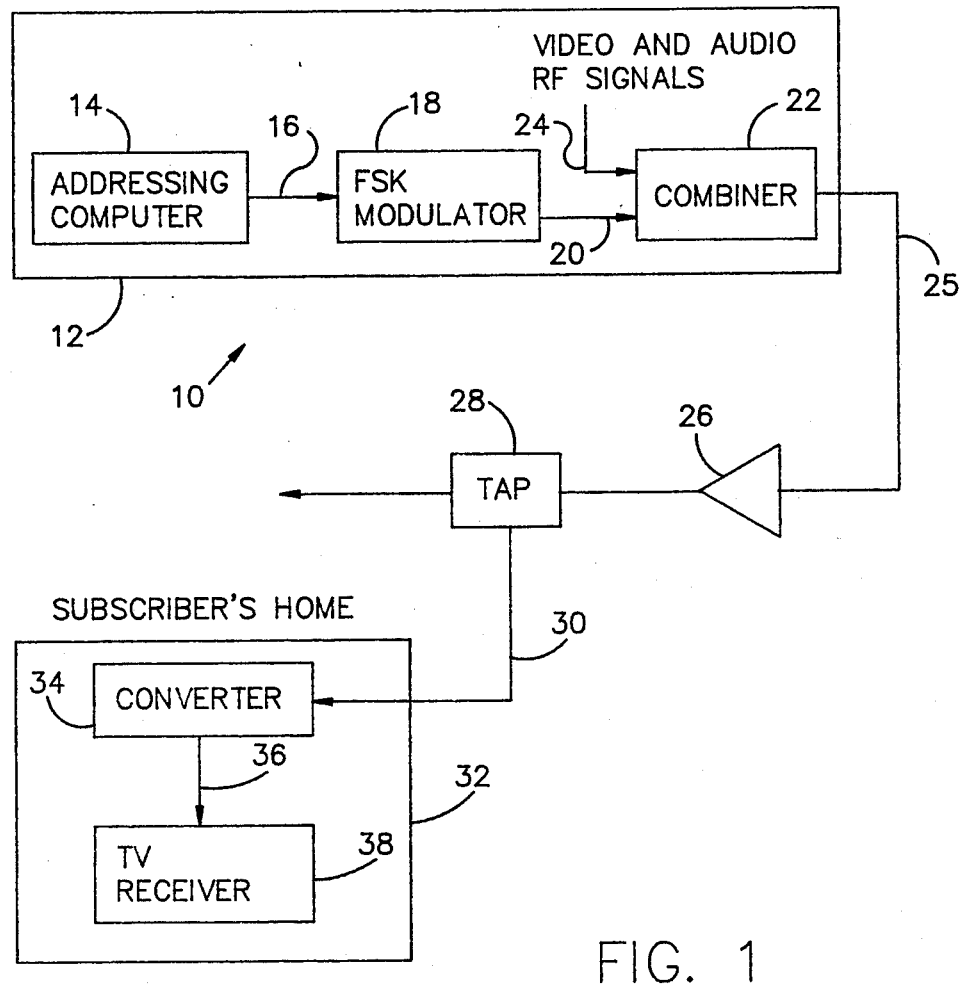
FIG. 1 is a block diagram of a CATV system in which individually installed converters are addressable from a central or head-end computer for enabling or disabling certain functions within the converter.

Referring now to the drawings, and more particularly to FIG. 1, there is shown a block diagram of a CATV system 10 with addressable converters, only one such converter being shown for the sake of simplicity. At the head end 12 from which all video, audio and addressing signals originate, there is an addressing computer 14 with peripheral equipment, such as printers, terminals, interfaces, etc. (not shown). The addressing computer 14 is the source of addressing commands and communicates via a serial digital link 16 to the FSK modulator 18. The link 16 provides a baseband data signal which forms addressing commands, and the FSK modulator 18 transforms the baseband input to an RF signal suitable for transmission over a CATV distribution system. The output of the FSK modulator 18 is supplied via an RF link 20 to one input of a combiner 22, the other input of which is the cable 24 conveying all video and audio signals for distribution. The combiner 22 sums all video, audio and addressing signals to form a single FDM signal for transmission on the cable distribution system 25.

The cable distribution system 25 includes a plurality of amplifiers 26 to maintain signal levels, only one of which is shown, and a plurality of taps 28 to provide signals from the distribution system for the subscribers' homes, only one of which is shown. Within a subsriber's home 32, a cable drop 30 is provided from a tap 28 to an addressable converter 34. The video and audio output from the converter 34 is supplied via a cable 36 to a television receiver 38.

Figure 2:
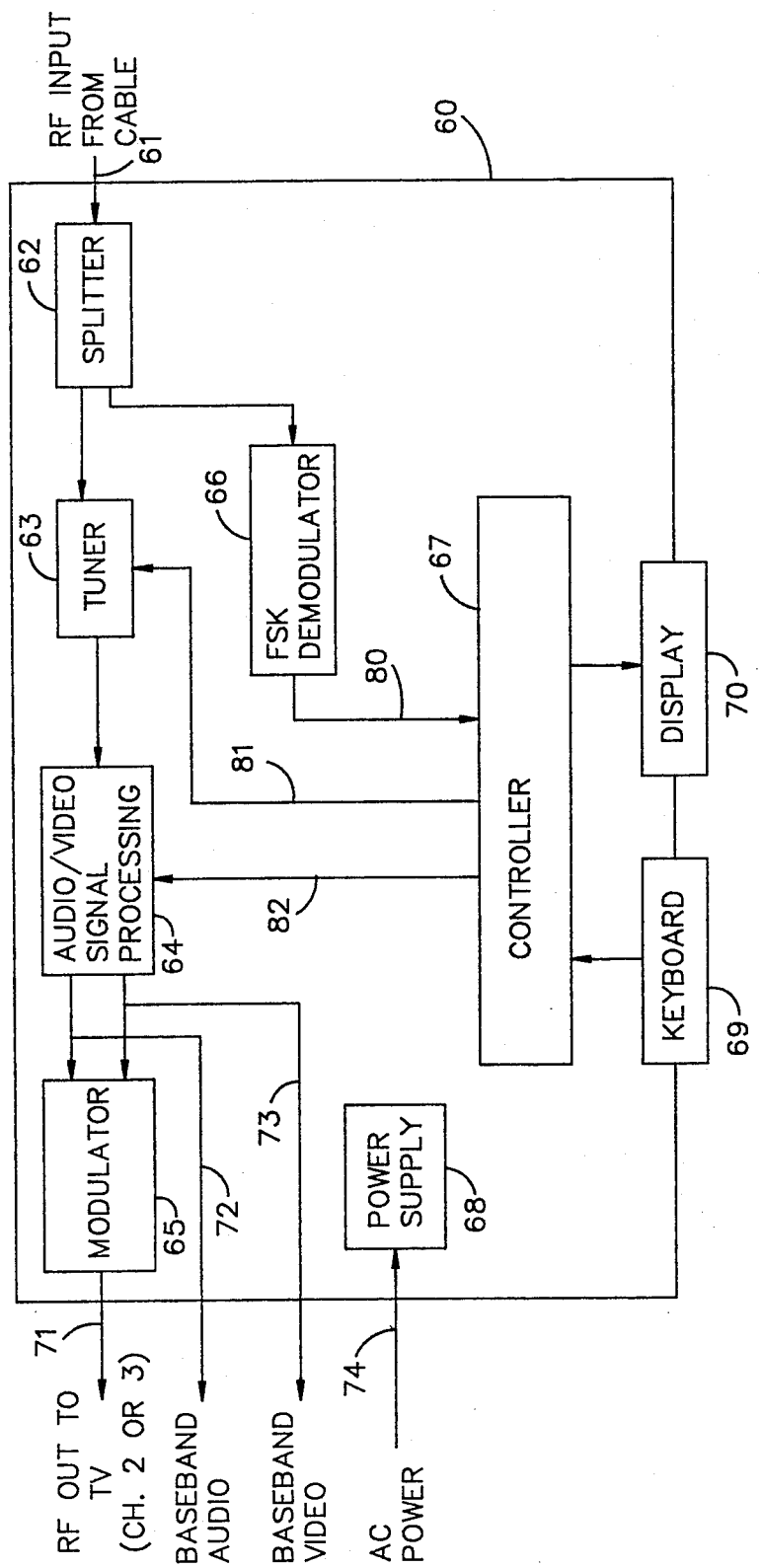
FIG. 2 is a block diagram of the addressable CATV converter according to the present invention.

Turning now to FIG. 2, there is shown a block diagram of an addressable CATV converter 60. The converter is provided with an RF input port 61 where all audio, video and addressing signals are delivered from the cable drop. This RF input port is connected to the input of a splitter 62 which splits the input signal such that one output is available to drive the tuner 63 and a second output is available to drive an FSK demodulator 66. The tuner 63 is used to convert the desired video and audio signals appearing at the converter input to fixed intermediate frequencies (typically 45.75 MHz for the picture carrier and 41.25 MHz for the audio carrier). The output of the tuner 63 is supplied to the video and audio signal processing circuitry 64. This circuitry may include a descrambling capability. The baseband video and audio outputs 72 and 73 from the processing circuitry 64 are supplied to an RF modulator 65 which provides at its output 71 a standard television signal, usually corresponding to channel 3 or 4, for connection to the television's RF input (e.g., antenna terminals).

The input to the FSK demodulator is the RF signal conveying addressing commands. The signal is demodulated to form the baseband addressing signal which is supplied via line 80 to the controller 67. The controller 67 is a microprocessor based circuit which provides the "intelligence" for the converter. The controller decodes the baseband addressing signal received from the FSK demodulator and processes received commands. These commands control which channels are viewable, as well as controlling the availability of features, such as remote control, parental control, special event viewing, and the like. The controller 67 also receives and processes inputs from the user via a front panel keyboard 69 in a well known manner. The keyboard enables the user to turn the converter on and off, select channels, control the volume and so forth. The controller 67 also controls the front panel display 70. The display indicates selected channel numbers and possibly other information depending on the feature content of the converter. In response to user inputs and received addressing commands, the controller generates appropriate signals on line 81 to the tuner 63 and on line 82 to the video and audio processing circuitry 64 to permit or prevent the viewing of selected channels. The control signals to the tuner are used to select the desired channel for viewing, and the control signals to the processing circuitry convey, for example, descrambling parameters. Completing the block diagram is a power supply 68 which is connected to a source of AC power and supplies all DC voltages required for converter operation.

A portion of the converter memory is reserved to store the list of channels which have been "blocked" by the user. This portion of the converter memory stores the BLOCKED_CHANNEL_MEMORY variable which will be described in more detail with reference to the flow charts of FIGS. 6 to 11. As shown in the memory map of FIG. 3, contiguous locations in memory are reserved for storing blocked channels; each bit in this portion of memory is associated with a unique channel. If the bit is set, the channel is blocked. If the bit is reset, the channel is not blocked.

A portion of the converter memory is reserved to store the access code. This portion of the converter memory stores the ACCESS_CODE variable. The access code is a four digit decimal number created by the user. As shown in the memory map of FIG. 4, it is stored in two contiguous bytes in memory. The code is stored a four binary coded decimal (BCD) numbers, where each BCD number resides in half of a byte (nibble). If no access code exists as when the user has not yet defined a code or a "clear parental control" command has purged an existing code, each nibble contains F in hexidecimal code.

In addition to the BLOCKED_CHANNEL_MEMORY and ACCESS_CODE variables described above, the following variables are used in the flow charts and the Program Design Language (PDL) code which are described hereinafter.

WRONG_GUESS: This variable occupies a single byte and tallies the number of times the user has input an incorrect access code.

WRONG_GUESS_TIMER: This variable is used to time-out a fifteen minute time period. It is initialized to fifteen minutes upon the first wrong guess of an access code by the user. An interrupt routine periodically decrements the timer such that it reaches zero after a fifteen minute time interval has expired. Only two additional wrong guesses are permitted while WRONG_GUESS_TIMER is non-zero.

LOCK_OUT_TIMER: This variable is used to time-out a fifteen minute time period. It is initialized to fifteen minutes after the user has input three incorrect access codes during a previous fifiteen minute time interval. An interrupt routine periodically decrements the timer such that it reaches zero after a fifteen time interval has expired. While LOCK_OUT_TIMER is non-zero, the user is not permitted to input an access code.

NUM_KEY_COUNT: This variable tallies the number of numerical keys input by the user while the user is entering an access code. Since four and only four numberical key inputs are acceptable, this variable is used to determine the validity of user inputs. This will be explained in further detail with reference to the flow chart shown in FIG. 9 for the enter access code mode.

Figure 5:
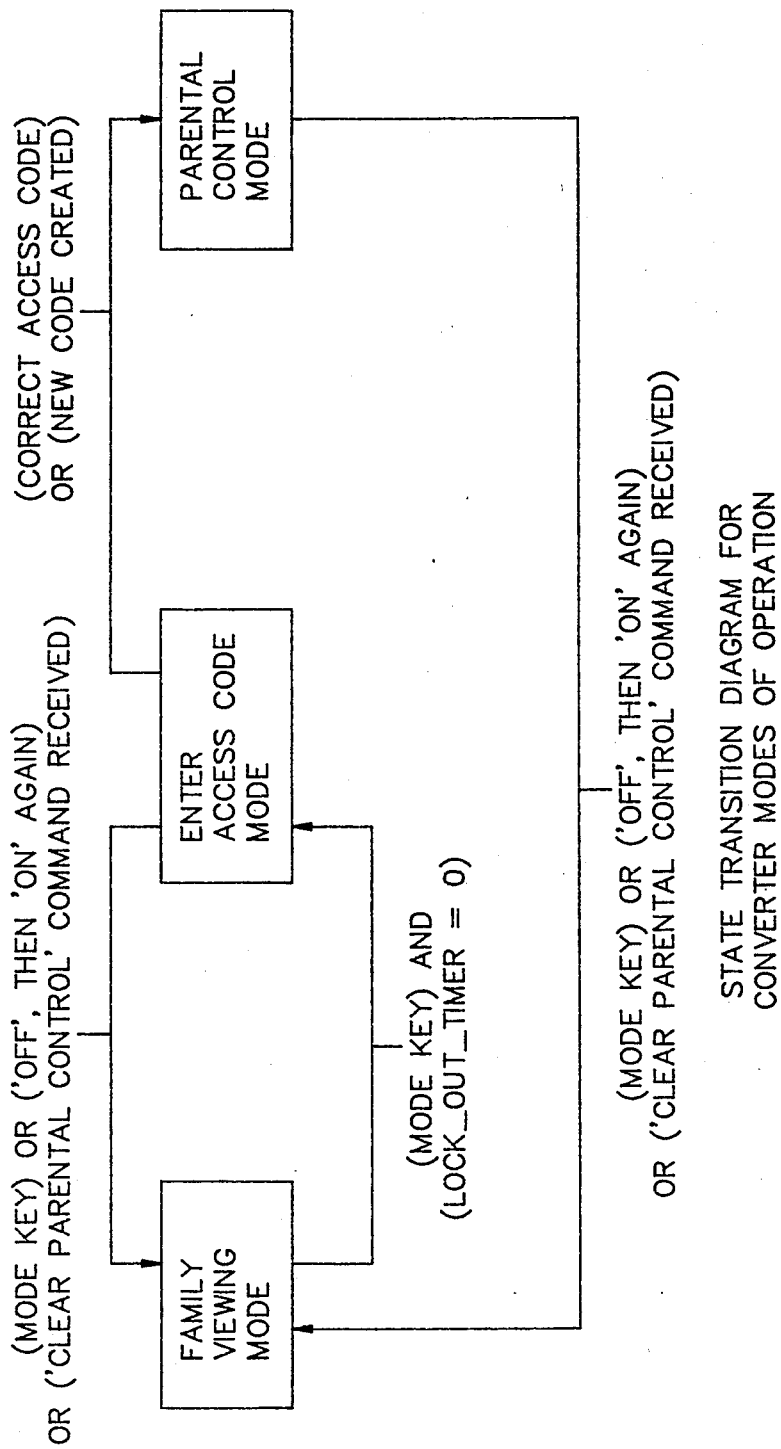
FIG. 5 is a state transition diagram for the converter modes of operation.

As shown in FIG. 5, the converter has three user-controlled modes of operation. A change in the mode of operation is accomplished by using a "mode" key on the keyboard 69 shown in FIG. 2. A summary of the converter behavior in each mode and how transitions from one mode to another are accomplished are given below:

FAMILY VIEWING MODE: In family viewing mode, all blocked channels are not viewable. Furthermore, channels cannot be blocked or unblocked in this mode. Each time the converter is turned on after being off, it turns on in family viewing mode, regardless of the mode of operation prior to being turned off.

ENTER ACCESS CODE MODE: In enter access code mode, the user is permitted to enter an access code. If no code currently exists in memory, any four digit code is accepted as a "correct" code and this value is stored in memory. This permits the user to create an access code. If an access code already exists, the user must input a value which matches the existing code. If the user matches the existing code, or correctly creates a new code, the transition to parental control mode occurs. Access to parental control mode is not permitted until the user correctly creates a new code or matches an existing code.

PARENTAL CONTROL MODE: In this mode, the list of blocked channels can be altered as desired. Also, any authorized channels which are blocked are viewable in this mode. This is done as a convenience to the user; it enables the user to watch blocked channels without having to reprogram the memory.

FIG. 5 illustrates how the mode key, LOCK_OUT_TIMER value and "clear parental control" command affect transitions between modes of operation.

The flow charts for the operation of the controller 67 are given in FIGS. 6 through 11. These flow charts define software functionality related to the subject invention. Considering first the flow chart shown in FIG. 6, the "converter off" mode of operation insures that the family viewing mode is automatically invoked each time the converter is turned on by the user. In decision block 100, a test is made to determine if the "power" key has been depressed. If not, the control loops until the power key is depressed, at which time the present mode of operation is set to family viewing mode in function block 101. Control then passes to one of the other routines depending on the particular inputs to the controller 67.

The flow chart shown in FIG. 6 is implemented in following Program Design Language (PDL) code from which source and object code for a specific microprocessor may be readily derived:

```
REPEAT
UNTIL power key is depressed
present mode = family viewing mode
```

-continued

```
RETURN
```

Figure 7:
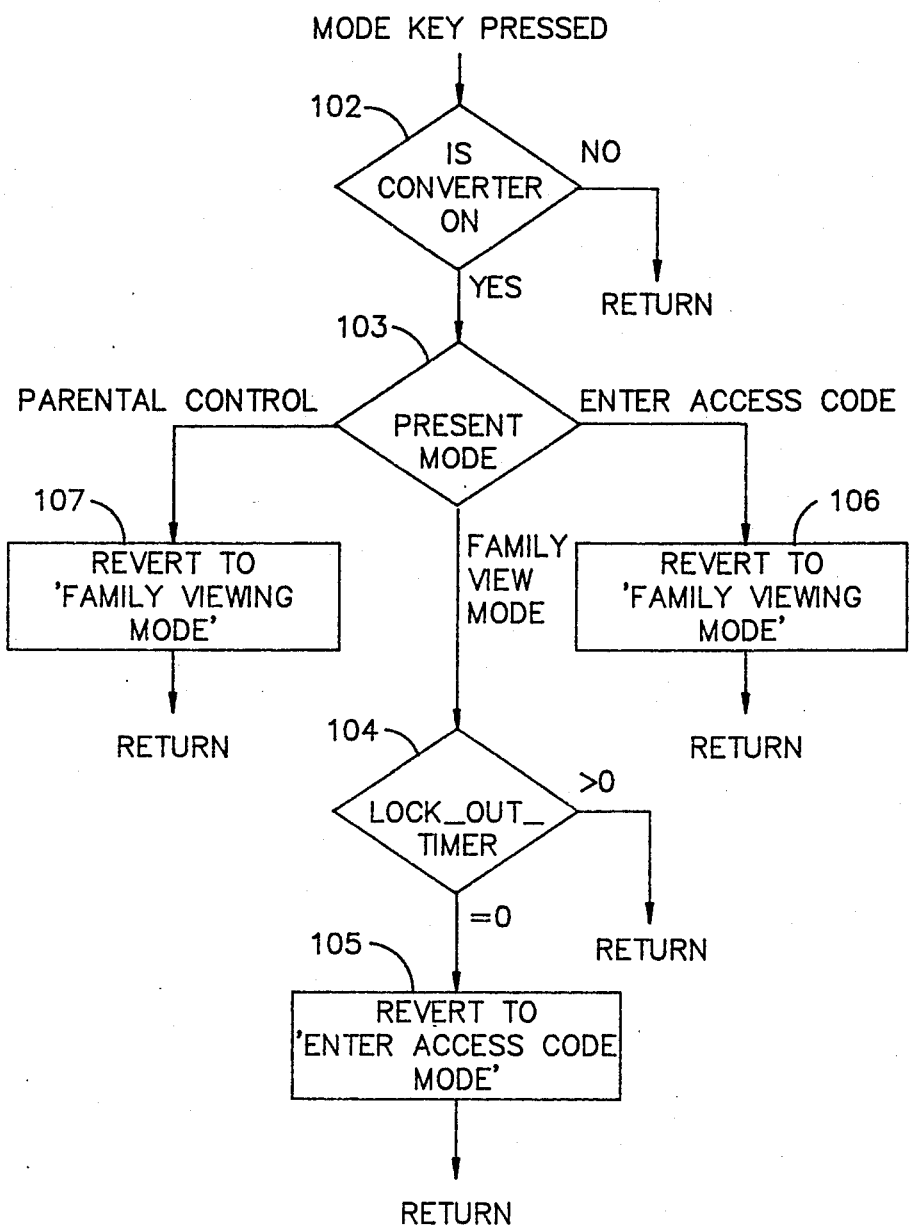
FIG. 7 is a flow chart for the "mode key processing" operation.

In FIG. 7, a test is made in decision block 102 to determine if the converter is on. If not, control returns to the converter off flow chart of FIG. 6; otherwise, a test is made in decision block 103 to determine what the present mode is. As previously mentioned, on initial turn on of power, the present mode is set to family viewing mode, and assuming that is the case here, a further test is made in decision block 104 to determine the status of the LOCK_OUT_TIMER. If is is not equal to zero, control returns to higher level processing; otherwise, the mode is set to enter access code mode (see FIG. 9) in function block 105 and control returns to higher level processing. In other words, if the mode key is pressed when the converter is in the family viewing mode and the LOCK_OUT_TIMER is equal to zero, then the conditions for changing the mode have been met as indicated in the state diagram of FIG. 5.

Returning to decision block 103, assume now that the present mode is enter access code in which case the mode is set to family viewing mode in function block 106 and control returns to higher level processing. Again, referring to the state diagram of FIG. 5, a condition necessary for changing mode from enter access code to family viewing mode has been satisfied by pressing the mode key. Since no other condition is necessary to cause this change in state, the change is made.

The the third alternative presented by decision block 103 is parental control mode, and if this is the case, the mode is set to family viewing mode in function block 107 and control returns to higher level processing. As was the case in changing from enter access code mode to family viewing mode, a condition necessary for changing from parental control mode to family viewing mode has been satisfied by pressing the mode key as shown in the state diagram of FIG. 5. Since no other condition is necessary to cause this change of state, the change is made.

The flow chart of FIG. 7 is implemented in the following PDL code:

```
IF converter is not on
    RETURN
ELSE
    IF present mode = parental control mode
        present mode = family viewing mode
        RETURN
    ELSE
        IF present mode = enter access code mode
            present mode = family viewing mode
            RETURN
        ELSE
            IF LOCK_OUT_TIMER = 0
                present mode = enter access code mode
                RETURN
            ELSE
                RETURN
            ENDIF
        ENDIF
    ENDIF
ENDIF
RETURN
```

Figure 8:
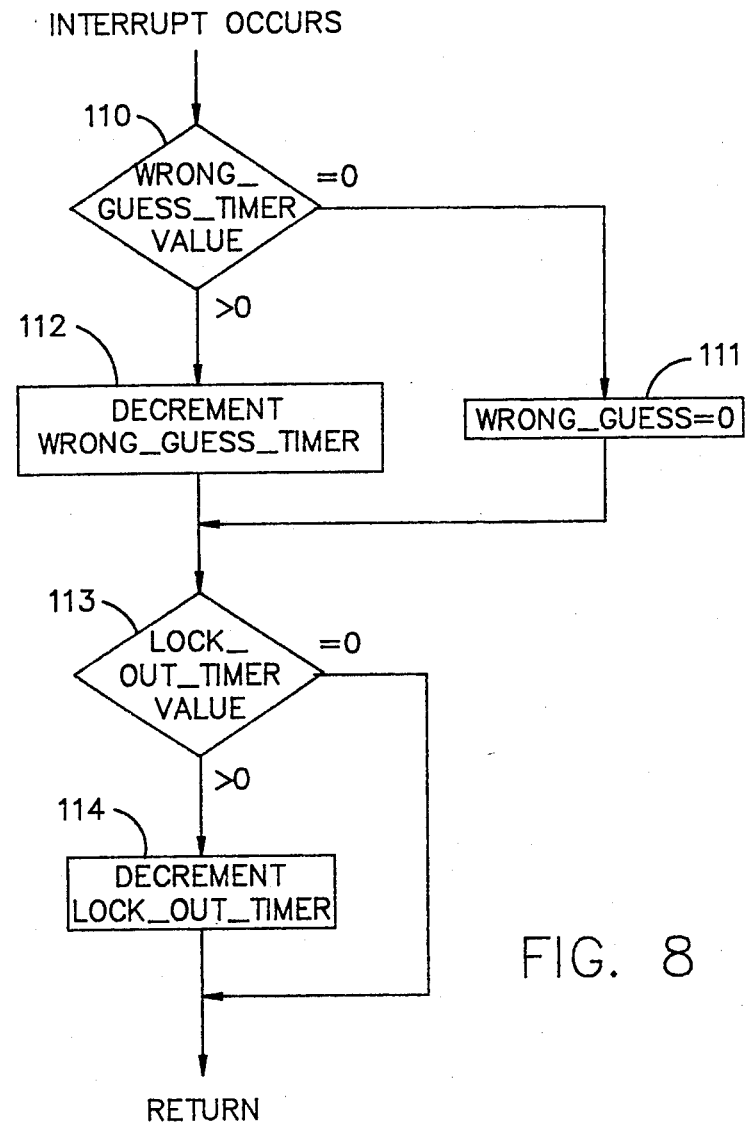
FIG. 8 is a flow chart for the "interrupt" operation.

The "interrupt" mode of operation is shown in FIG. 8. The microprocessor used is assumed to have an interrupt capability. In this application, interrupts are generated at fixed time intervals to accomplish proper control of timers. In the interrupt routine, WRONG_GUESS_TIMER and LOCK_OUT_TIMER are decremented whenever they have non-zero values. Otherwise, the timers are not altered. In FIG. 8, when an interrupt occurs, a test is made in decision block 110 to determine the value of WRONG_GUESS_TIMER. If it is zero, then WRONG_GUESS is set to zero in function block 111; otherwise, WRONG_GUESS_TIMER is decremented in function block 112. After either of these functions is performed, a test is made in decision block 113 to determine the value of the LOCK_OUT_TIMER. If it is zero, control returns to higher level processing; otherwise, the LOCK_OUT_TIMER is decremented in function block 114 and then control returns to higher level processing.

The interrupt flow chart shown in FIG. 8 is implemented in the following PDL code:

```
IF WRONG_GUESS_TIMER = 0
    WRONG_GUESS = 0
ELSE
    decrement WRONG_GUESS_TIMER
ENDIF
IF LOCK_OUT_TIMER = 0
    RETURN
ELSE
    decrement LOCK_OUT_TIMER
ENDIF
RETURN
```

Turning now to FIG. 9, the flow chart for enter access code mode is shown. Remember from the state diagram of FIG. 5 that this mode is entered from the family viewing mode by pressing the mode key when the value of the LOCK_OUT_TIMER is zero. Since the converter must be on before enter access code mode can be invoked, this flow chart assumes that the converter is already on; i.e., the test made in decision block 100 in FIG. 6 is true. This flow chart conveys the following processing characteristics:

1. Depressing the mode key causes the converter to change to family viewing mode and return to higher level processing.

2. Depressing the power key turns the converter off and returns to higher level processing.

3. The user must "terminate" an access code entry with the "enter" key. Prior to pressing the enter key, the user must input four and only four numeric keys; otherwise, the input is rejected.

4. If the user inputs four numeric keys as an access code and no code previously existed, then the user has created an access code; the converter changes mode to parental control mode as indicated by the state diagram of FIG. 5. When the user is creating an access code, any number of attempts are permitted.

5. If the user inputs four numeric keys as an access code, and this code matches an existing code in memory, then the converter changes mode to parental access mode as indicated by the state diagram of FIG. 5.

6. The first wrong guess initializes WRONG_GUESS_TIMER to fifteen minutes. Only two additional wrong guesses are permitted within that fifteen minute time period.

7. If three wrong guesses occur within a fifteen minute time period, then LOCK_OUT_TIMER is initialized to fifteen minutes and the converter changes mode to family viewing mode. As shown in FIG. 7, as long as LOCK_OUT_TIMER remains non-zero, access to enter access code mode is not permitted.

Figure 9A:
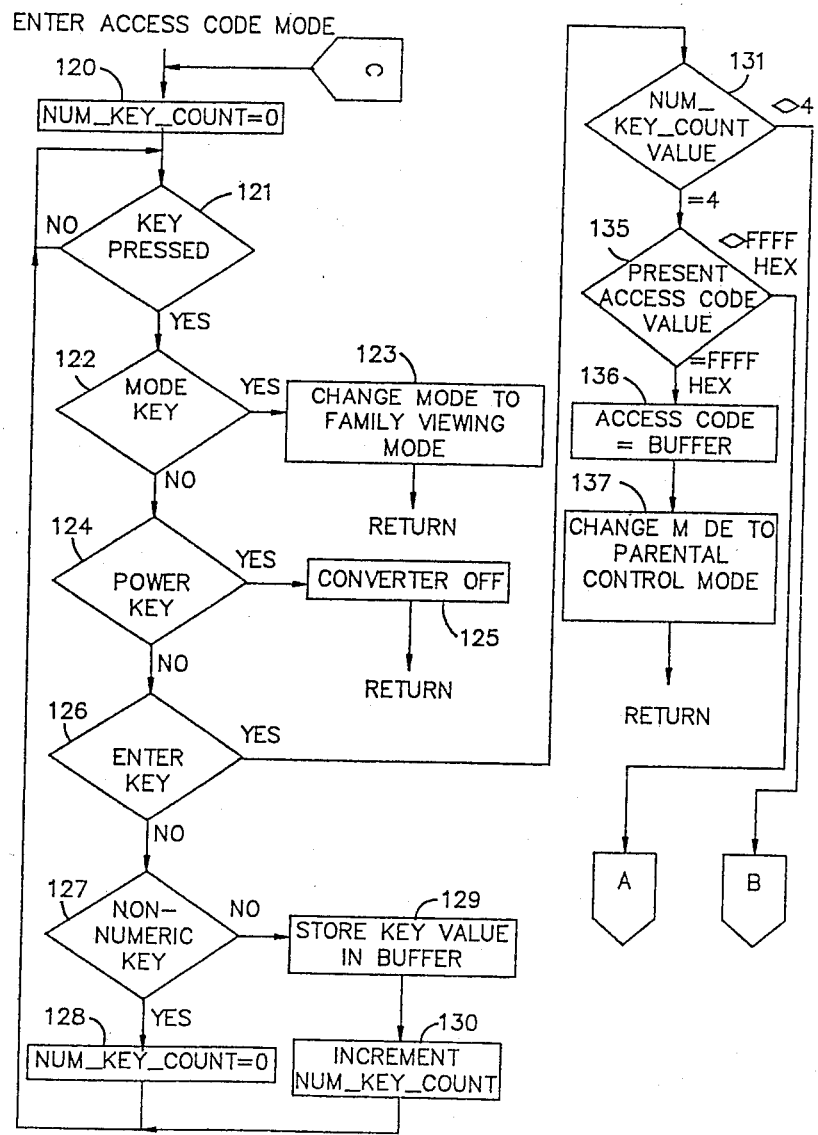
FIGS. 9A and 9B, taken together, are a flow chart for the "enter access code mode" operation.
Figure 9B:
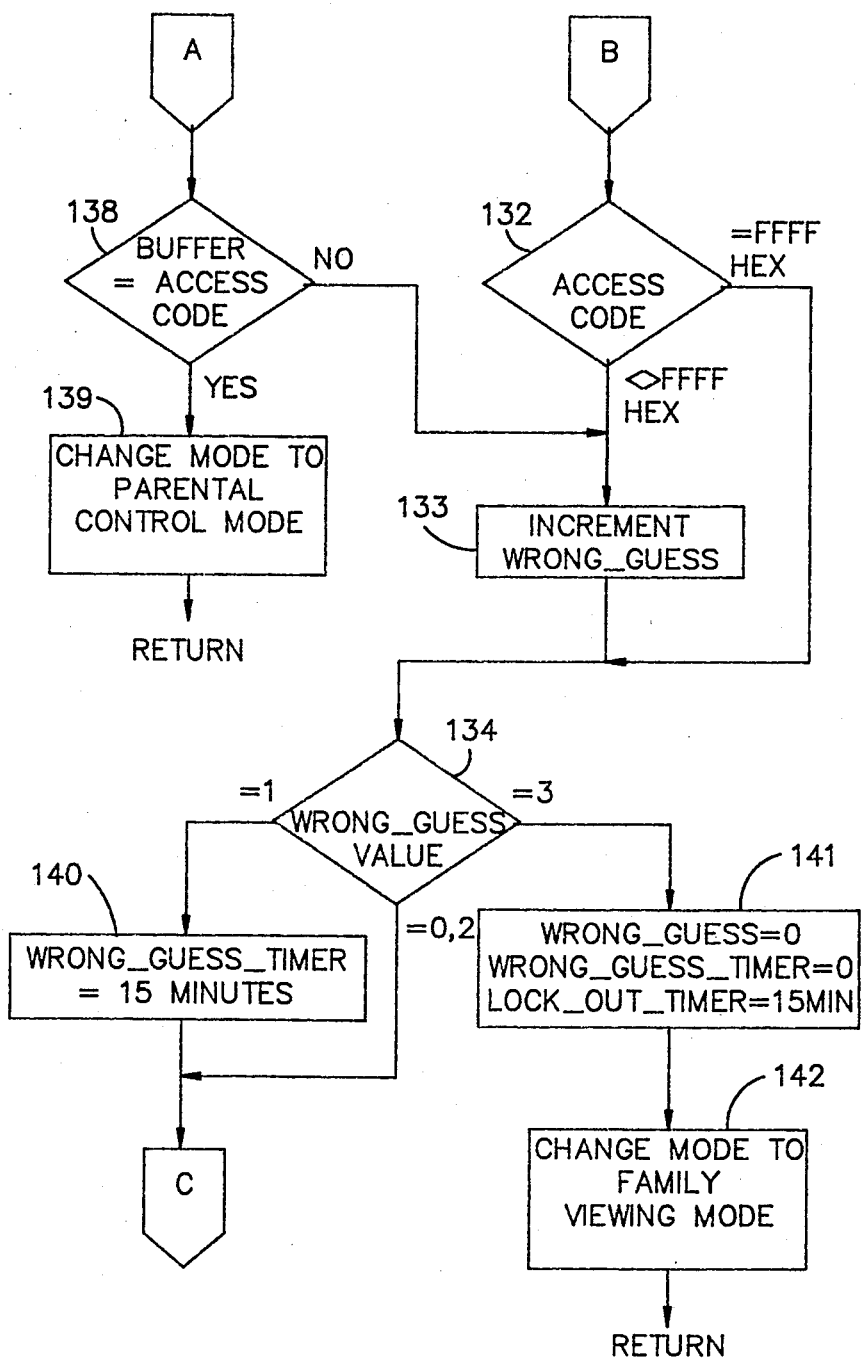

Now with particular reference to FIGS. 9A and 9B, when access code mode is entered, NUM_KEY_COUNT is initialized to zero in function block 120. A test is then made in decision block 121 to determine if a key has been depressed. If not, control loops until a key is depressed at which time a test is made in decision block 122 as to whether the key depressed is a mode key. If so, the mode is changed to family viewing mode in function block 123 and control returns to higher level processing; otherwise, a test is next made in decision block 124 to determine if the key depressed is the power key. If it is, the converter is turned off in function block 125 and control returns to higher level processing; otherwise, a test is next made in decision block 126 to determine if the key depressed is the ENTER key. Initially, it will be assumed that the key depressed is not the ENTER key in which case a test is next made in decision block 127 to determine if the key depressed is a non-numeric key. If it is, the NUM_KEY_COUNT is reset to zero in function block 128 and control returns to decision block 121; otherwise, the numeric key value is stored in a buffer in function block 129 and then the NUM_KEY_COUNT is incremented in function block 130 before control retruns to decision block 121.

Returning now to decision block 126, assume that the ENTER key has been depressed. In this case, a test is made in decision block 131 to determine the value of NUM_KEY_COUNT. Remember that the only valid value is four. If the value is not equal to four, a test is made in decision block 132 to determine if the present access code is hexidecimal FFFF indicating that there is no access code currently stored in memory. If not, WRONG_GUESS is incremented in function block 133 and control goes to decision block 134; otherwise, control goes directly to decision block 134.

Going back to decision block 131, assume that the value of NUM_KEY_COUNT is equal to four in which case a test is made in decision block 135 to determine what the present access code value is. If the access code value is hexidecimal FFFF, the new value contained in the memory buffer is transferred to that portion of the memory (as shown in FIG. 4) which stores the access code as indicated in function block 136, and then the mode is changed to parental control mode as indicated in function block 137 and control is returned to higher level processing. On the other hand, if the present access code value is not hexidecimal FFFF, then a test is made in decision block 138 to determine if the entered access code stored in the memory buffer is equal to the access code stored in memory. If it is, then the mode is changed to parental control mode in function block 139 and control returns to higher level processing; otherwise, WRONG_GUESS is incremented in function block 133.

In the case of a wrong guess, the value of WRONG_GUESS is determined in decision block 134. If it is equal to one, then the WRONG_GUESS_TIMER is set to count down from fifteen minutes in function block 140, and control returns to function block 120. If the value of WRONG_GUESS is either zero or two, then control returns directly to function block 120. If the value of WRONG_GUESS is three, WRONG_GUESS and WRONG_GUESS_TIMER are initialized to zero and the LOCK_OUT_TIMER is set to fifteen minutes in function block 141. Then in function block 142, the mode is changed to family viewing mode and control returns to higher level processing.

The enter access code mode flow chart shown in FIGS. 9A and 9B is implemented in the following PDL code:

```
REPEAT
    NUM_KEY_COUNT = 0
    REPEAT
        DO WHILE no key is depressed
        END WHILE
        IF depressed key = mode key
            present mode = family viewing mode
            RETURN
        ELSE
            IF depressed key = power key
                turn converter off
                RETURN
            ELSE
                IF depressed key = non-numeric key
                    NUM_KEY_COUNT = 0
                ELSE
                    store key value in buffer
                    increment NUM_KEY_COUNT
                ENDIF
            ENDIF
        ENDIF
    UNTIL enter key is depressed
    IF NUM_KEY_COUNT is not equal to 4
        IF present access code is not equal to FFFF
            increment WRONG_GUESS
        ENDIF
    ELSE
        IF present access code is equal to FFFF
            access code = buffer contents
            present mode = parental control mode
            RETURN
        ELSE
            IF buffer is equal to current access code
                present mode = parental control mode
                RETURN
            ELSE
                increment WRONG_GUESS
            ENDIF
        ENDIF
    ENDIF
    IF WRONG_GUESS = 3
        WRONG_GUESS = 0
        WRONG_GUESS_TIMER = 0
        present mode = family viewing mode
        LOCK_OUT_TIMER = 15 minutes
        RETURN
    ELSE
        IF WRONG_GUESS = 1
            WRONG_GUESS_TIMER = 15 minutes
        ENDIF
    ENDIF
UNTIL LOCK_OUT_TIMER is not equal to 0
RETURN
```

Figure 10:
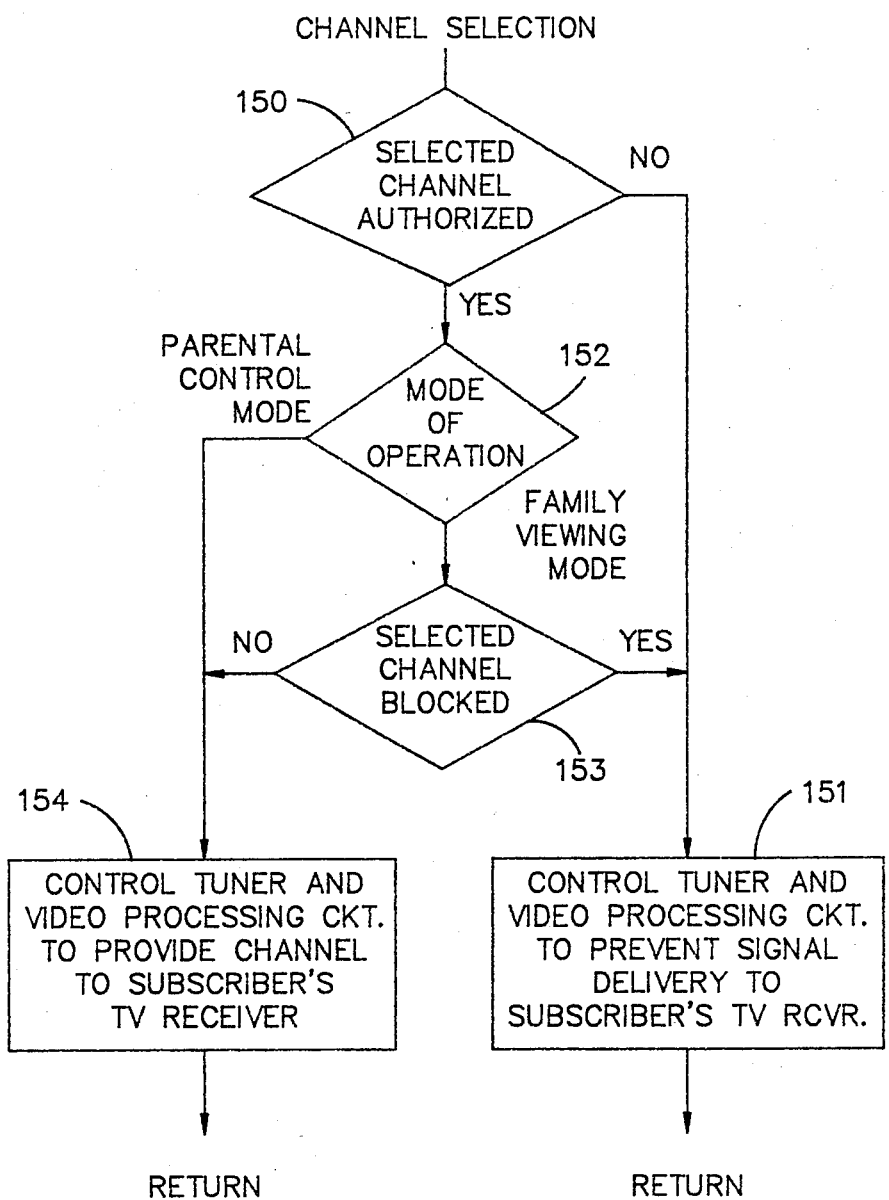
FIG. 10 is a flow chart for the "channel selection" operation.

The channel selection flow chart is shown in FIG. 10. This flow chart defines the processing when the user selects a channel. When a channel is entered by the user, a test is made in decision block 150 to determine if the selected channel is authorized. An authorized channel is a channel the subscriber has paid to view. If the channel selected in not an authorized channel, then the tuner 63 and the processing circuitry 64 are supplied with control signals by controller 67 to prevent signal delivery to the subscriber's television receiver in function block 151 and control returns to higher level processing.

Assuming, however, that the selected channel is authorized, then control goes to decision block 152 which tests for the current mode of operation. If the current mode is family viewing mode, a test is then made in decision block 153 to determine if the selected channel is blocked. This is accomplished by a compare action with the list of blocked channels (see FIG. 3). Should the selected channel be on the list of blocked channels, control goes to function block 151 where signal delivery to the subsrciber's television receiver is prevented.

On the other hand, if the mode of operation as determined in decision block 152 is parental control mode or if the selected channel as determined in decision block 153 is not on the list of blocked channels, control goes to function block 154 where the required signals are generated on lines 81 and 82 to control the tuner 63 and the processing circuitry 64, respectively, so that the desired channel signal is supplied to the subscriber's television receiver.

The flow chart for channel selection shown in FIG. 10 is implemented in the following PDL code:

```
IF selected channel is not authorized
    control tuner and video/audio processing
        circuitry to prevent signal delivery to
            subscriber's television receiver
ELSE
    IF present mode = parental control mode
        control tuner and video/audio processing
            circuitry to provide selected channel to
                subscriber's television receiver
    ELSE
        IF channel is blocked
            control tuner and video/audio processing
                circuitry to prevent signal delivery to
                    subscriber's television receiver
        ELSE
            control tuner and video/audio processing
                circuitry to provide channel to
                    subscriber's television receiver
        ENDIF
    ENDIF
ENDIF
RETURN
```

FIG. 11 shows the flow chart for addressing command received and defines how the clear parental control command is used to purge the access code and unblock all blocked channels in a selected converter. The command also places the converter in family viewing mode regardless of the mode of operation selected when the command was received. In FIG. 11, a test is made in decision block 160 to determine if the command is addressed to this converter. It will be recalled that the command signals from the head end of the CATV system are decoded by the FSK demodulator 66. Each addressable converter will have a unique address which may be hard wired in the system or stored in read only memory (ROM). This address is compared with any address decoded by the FSK demodulator 66 and if a match occurs, control goes to decision block 161; otherwise, control returns to higher level processing. Assuming that the command is addressed to this converter, a test is made in decision block 161 to determine if the command received is a CLEAR_PARENTAL_CONTROL command. If it is not, the command is appropriately processed in function block 162 and control is returned to higher level processing. On the other hand, if the command is the CLEAR_PARENTAL_CONTROL command, then in function block 163, the access code stored in memory is initialized to FFFF hexadecimal, all bits in the channel block out list are cleared, and WRONG_GUESS, LOCK_OUT_TIMER and WRONG_GUESS_TIMER are all initialized to zero. Then, in function block 164, the present mode of operation is set to family viewing mode before a return is made to higher level processing.

The following PDL code implements the flow chart for the addressing command received:

```
IF received command is not addressed to this
        converter
    RETURN
ELSE
    IF received command is 'clear parental control'
            command
        access code = FF, FF hex
        clear all bits in channel block-our portion of
            memory
        WRONG_GUESS = 0
        LOCK_OUT_TIMER = 0
        WRONG_GUESS_TIMER = 0
        present mode of operation = family viewing
            mode
        RETURN
    ELSE
        process received command as appropriate
    END IF
END IF
RETURN
```

While the invention has been described in terms of a preferred embodiment, those skilled in the art will recognize that the invention may be practiced with modifications and alterations within the spirit and scope of the appended claims.

Having thus described my invention, what I claim as new and desire to secure by Letters Patent is as follows:

1. An addressable CATV converter having a parental control system in which selected authorized channels may be locked out for normal viewing comprising:

a tuner, video and audio signal processing circuits, and a modulator, said tuner being connectable to a CATV cable feed for receiving RF input signals and converting selected RF input signals to IF signals, said video and audio signal processing circuits being connected to said tuner for processing video and audio signals contained in said IF signals, and said modulator being connected to said video and audio signal processing circuits for modulating said video and audio signals at a predetermined radio frequency to be supplied to a television receiver;

code demodulator means connectable to said CATV cable feed for receiving and demodulating coded address and command signals;

keyboard input means for permitting a user to input power on and off commands, a mode command, an access code, and a desired viewing channel number; and three state controller means connected to receive as inputs said coded address and command signals from said code demodulator means and user inputs from said keyboard input means and connected to provide control outputs to said tuner and said video and audio processing circuits, said three state controller means including memory means for storing a user entered access code and a list of user designated blocked channels, said three state controller means having a family viewing mode in which authorized channels which have not been locked out may be viewed, an enter access code mode, and a parental control mode in which all authorized channels may be viewed, said three state controller means being in the family viewing mode when said converter is turned off and then on, or a mode command is entered from said keyboard input means while said three state controller means is in either the enter access code mode or the parental control mode, or a clear parental control command is received by said three state controller means from said code demodulator means, said three state controller means being responsive to said clear parental control command to clear said user entered access code and delete said list of user designated blocked channels in said memory means, said three state controller means being in the enter access code mode when a mode command is entered from said keyboard input means while said three state controller means is in the family viewing mode, and said three state controller means being in said parental control mode when a correct access code or a new access code is created while said three state controller means is in the enter access code mode.

2. An addressable CATV converter as recited in claim 1 wherein said three state controller includes counting means initialized when said three state controller switches to the enter access code mode for counting access codes entered by a user and, if a predetermined number of incorrect access codes are entered, preventing the user from entering further access codes for a predetermined period of time.

3. An addressable CATV converter as recited in claim 2 wherein said three state controller further comprises timing means initialized with said counting means for resetting said counting means after a predetermined period of time.

4. A three state controller for an addressable CATV converter for controlling the channels which may be viewed by a subscriber identified by an address assigned to the converter, said three state controller being responsive to addressed commands from a CATV system to which it is connected and to user inputs for generating control signals for the converter, said three state controller means including memory means for storing a user entered access code and a list of user designated blocked channels, said three state controller having a family viewing mode in which authorized channels which have not been locked out may be viewed, an enter access code mode, and a parental control mode in which all authorized channels may be viewed, said three state controller being in the family viewing mode when said converter is turned off and then on, or a user input mode command is received while in either the enter access code mode or the parental control mode or a clear parental control command is received from the CATV system, said three state controller means being responsive to said clear parental control command for clearing said user entered access code and deleting said list of user designated blocked channels in said memory means, said three state controller being in the enter access code mode when a user input mode command is received while in the family viewing mode, and said three state controller being in the parental control mode when either a correct access code or a new code is created while in the enter access code mode.

5. A three state controller for an addressable CATV converter as recited in claim 4 further comprising counting means which is initialized when said three state controller switches to the enter access code mode for counting the number of access codes entered by a user and, if a predetermined number of incorrect access codes are entered, then preventing the user from entering further access codes for a predetermined period of time.

6. A three state controller for an addressable CATV converter as recited in claim 5 further comprising timing means initialized with said counter means for resetting said counter means after a predetermined period of time.

7. A method of controlling access to viewing of selected channels supplied by a CATV system to a subscriber's converter comprising the steps of:
building a table of channels which are locked out for normal viewing;
providing a store for an access code;
setting the converter in a family viewing mode when the converter is turned off and then on, said family viewing mode permitting viewing all authorized channels which have not been locked out as indicated by said table;
setting said converter to an enter access code mode in response to a user input mode command while said converter is in the family viewing mode;
setting said converter to a parental control mode in response to a user input of the correct access code contained in said store or, in the event that no access code is contained in said store, in response to a user entering a new access code in said store;
resetting said converter to the family viewing mode in response to a user input mode command while said converter is in either the enter access code mode or the parental control mode; and
resetting said converter to the family viewing mode in response to a clear parental control command received from said CATV system.

8. A method of controlling access to viewing of selected channels supplied by a CATV system to a subscriber's converter comprising the steps of:
building a table of channels which are locked out for normal viewing;
providing a store for an access code;
setting the converter in a family viewing mode when the converter is turned off and then on, said family viewing mode permitting viewing all authorized channels which have not been locked out as indicated by said table;
setting said converter to an enter access code mode in response to a user input mode command while said converter is in the family viewing mode;
setting said converter to a parental control mode in response to a user input of the correct access code contained in said store or, in the event that no access code is contained in said store, in response to a user cnetering a new access code in said store;
timing the user input of one or more access codes when the converter is set to the enter access code mode;
counting the number of incorrect access codes entered by the user when the converter is set to the enter access code mode; and
preventing the user from entering an access code is a predetermined number of incorrect access codes have been entered within said predetermined time period.

9. The method recited in claim 8 further comprising the step of resetting the converter to the family viewing mode when the user is prevented from entering an access code.

* * * * *